(12) United States Patent
Grawenhof et al.

(10) Patent No.: US 8,382,599 B2
(45) Date of Patent: Feb. 26, 2013

(54) UNIVERSAL JOINT ARRANGEMENT

(75) Inventors: Peter Grawenhof, Dettingen (DE); Hans Rosle, Heidenheim (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 0 days.

(21) Appl. No.: 13/010,501

(22) Filed: Jan. 20, 2011

(65) Prior Publication Data
US 2011/0143844 A1    Jun. 16, 2011

Related U.S. Application Data

(62) Division of application No. 11/635,198, filed on Dec. 7, 2006, now Pat. No. 7,892,099.

(30) Foreign Application Priority Data

Dec. 8, 2005 (DE) .......................... 10 2005 058 743

(51) Int. Cl.
*F16D 3/40* (2006.01)
(52) U.S. Cl. ...................... 464/128; 464/132; 384/905.1
(58) Field of Classification Search ................. 464/128, 464/130, 132; 384/126, 127, 425, 427, 440, 384/905.1
See application file for complete search history.

(56) References Cited

U.S. PATENT DOCUMENTS

| | | | |
|---|---|---|---|
| 2,078,739 A * | 4/1937 | Slaght | 464/132 X |
| 4,050,130 A * | 9/1977 | Pitner | 464/128 X |
| 4,366,996 A | 1/1983 | Grandel | |
| 4,834,691 A | 5/1989 | Schultze et al. | |
| 5,199,800 A * | 4/1993 | Bauer et al. | 384/905.1 |
| 6,926,611 B2 | 8/2005 | Rivin | |
| 2003/0103707 A1 | 6/2003 | Lindenthal et al. | |

FOREIGN PATENT DOCUMENTS

| | | | |
|---|---|---|---|
| EP | 0 553584 A1 * | 8/1993 | |
| JP | 56-10823 A * | 2/1981 | |

* cited by examiner

*Primary Examiner* — Gregory Binda
(74) *Attorney, Agent, or Firm* — Ice Miller LLP

(57) ABSTRACT

A universal joint arrangement with a journal cross, supported by bearings in two joint yokes offset to one another by 90°. Each joint yoke comprises a flange and two bearings. Each bearing has an axial bearing pressure disk that is supported by a first connection element on the joint yoke and a second connection element on the journal cross to form a first and second friction pairing. One of the connection elements has at least one elevated support region facing the axial bearing pressure disk. The support region is arranged in the region of low relative movement of the joint yoke with the journal cross, while the regions other than the support region lie in the region of greatest relative motion.

12 Claims, 13 Drawing Sheets

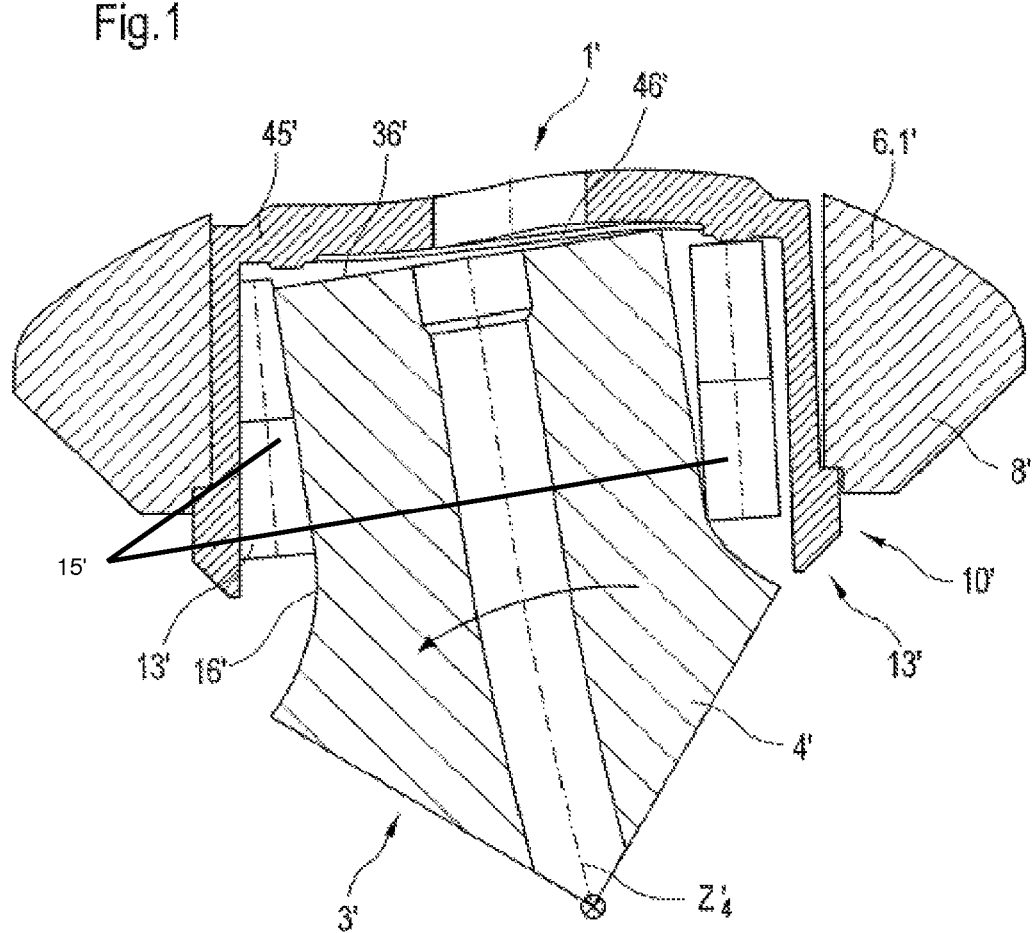
PRIOR ART

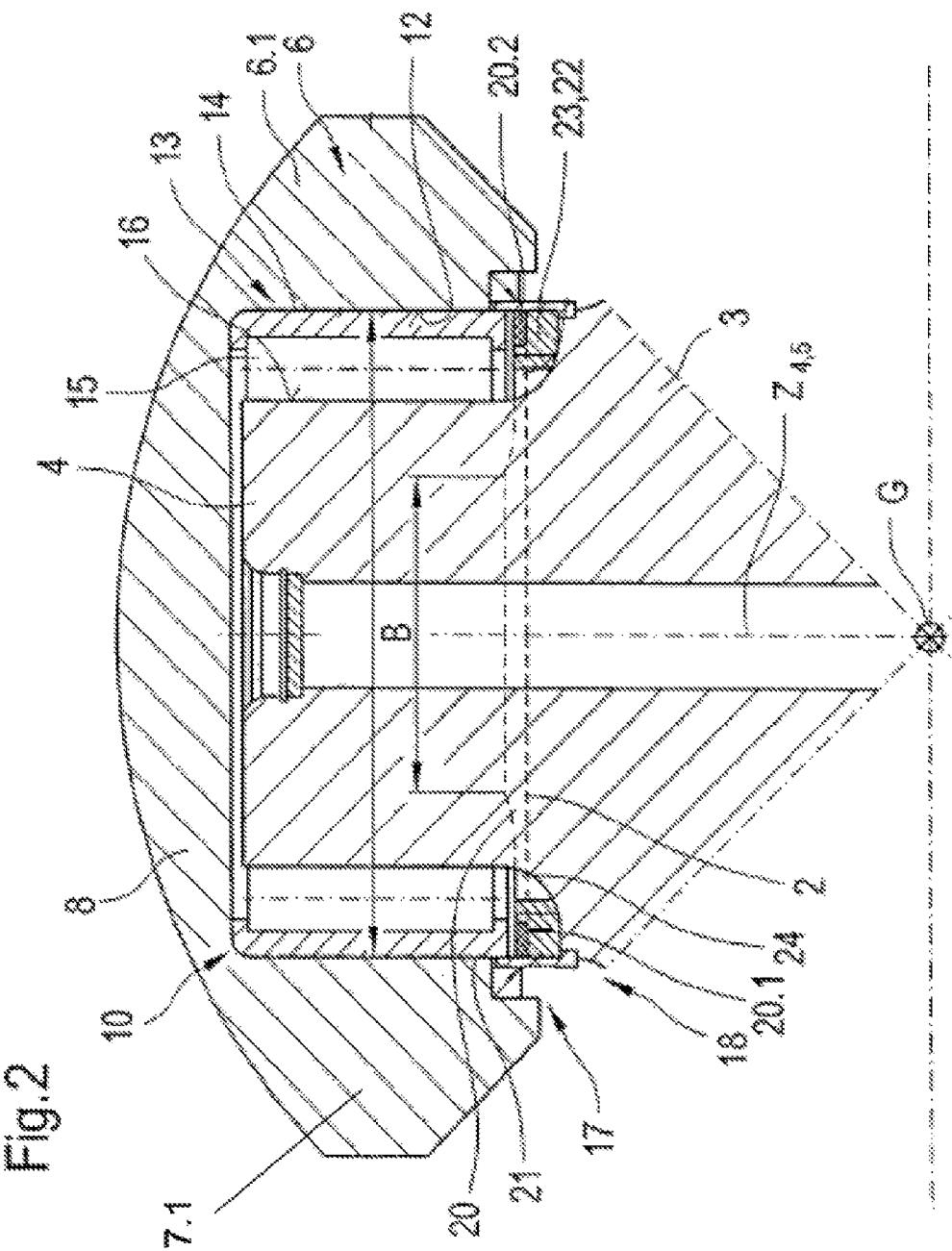

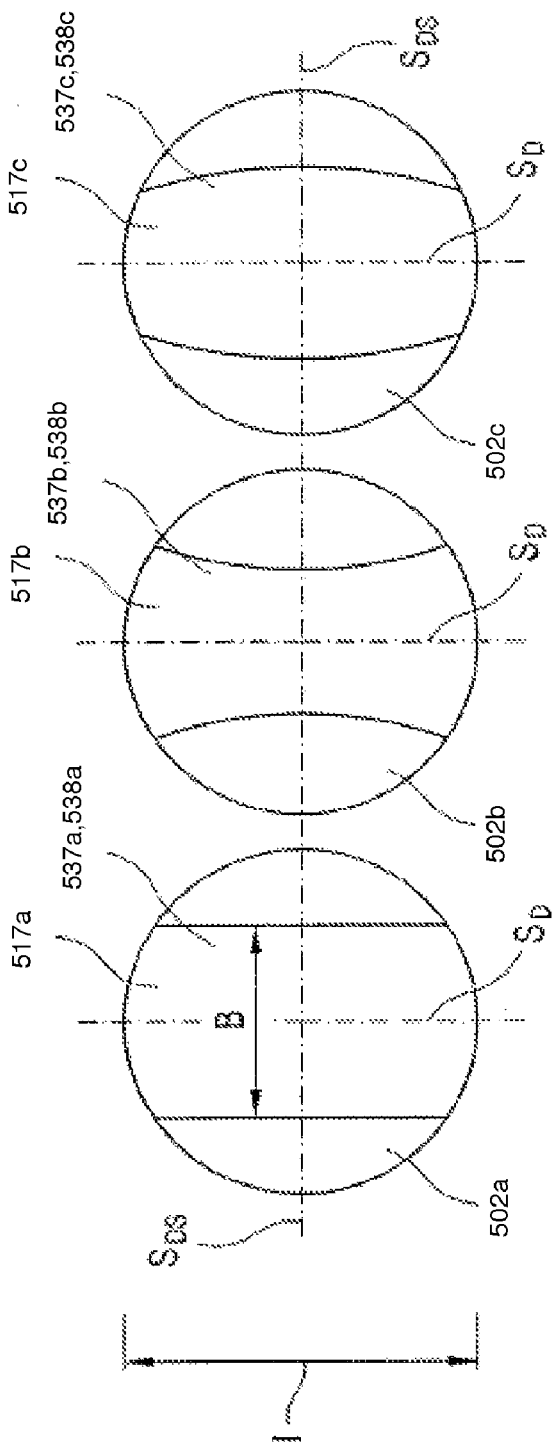

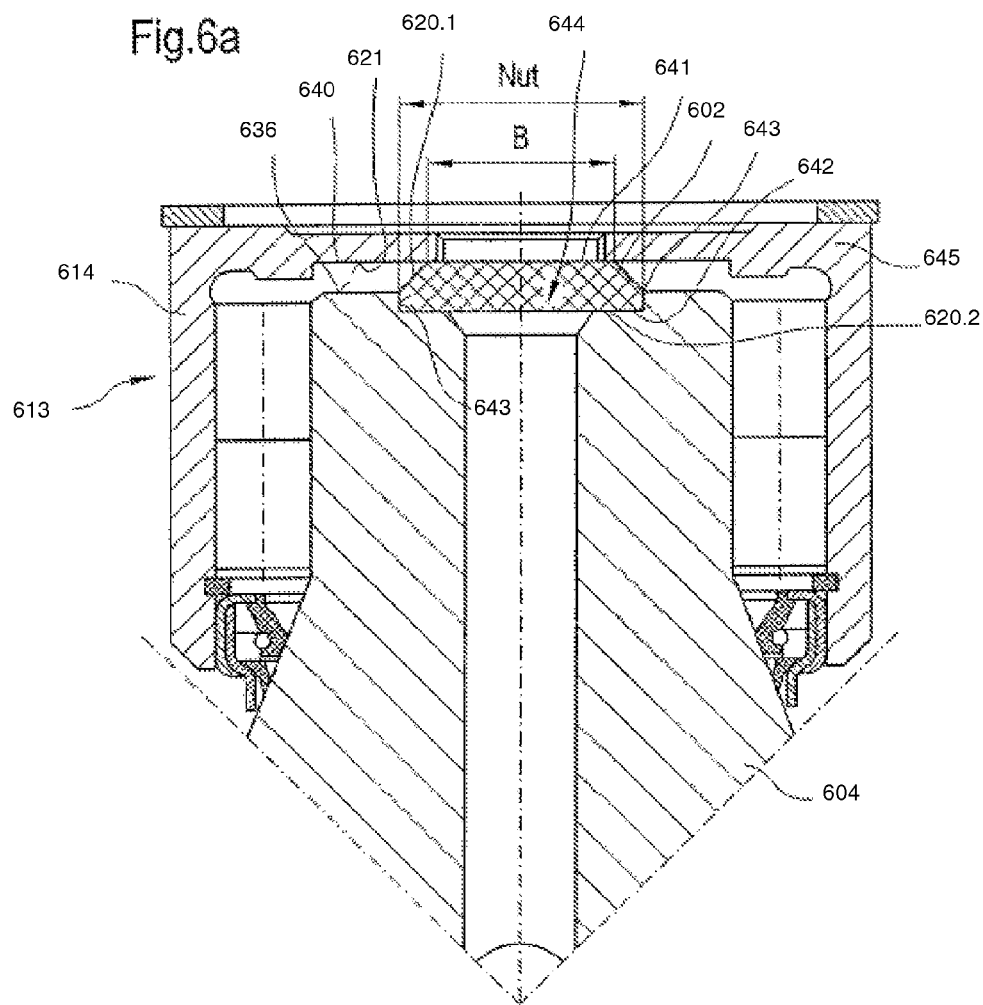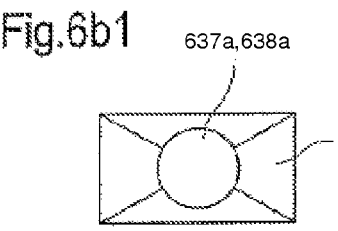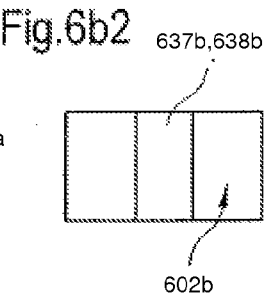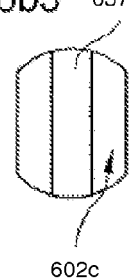

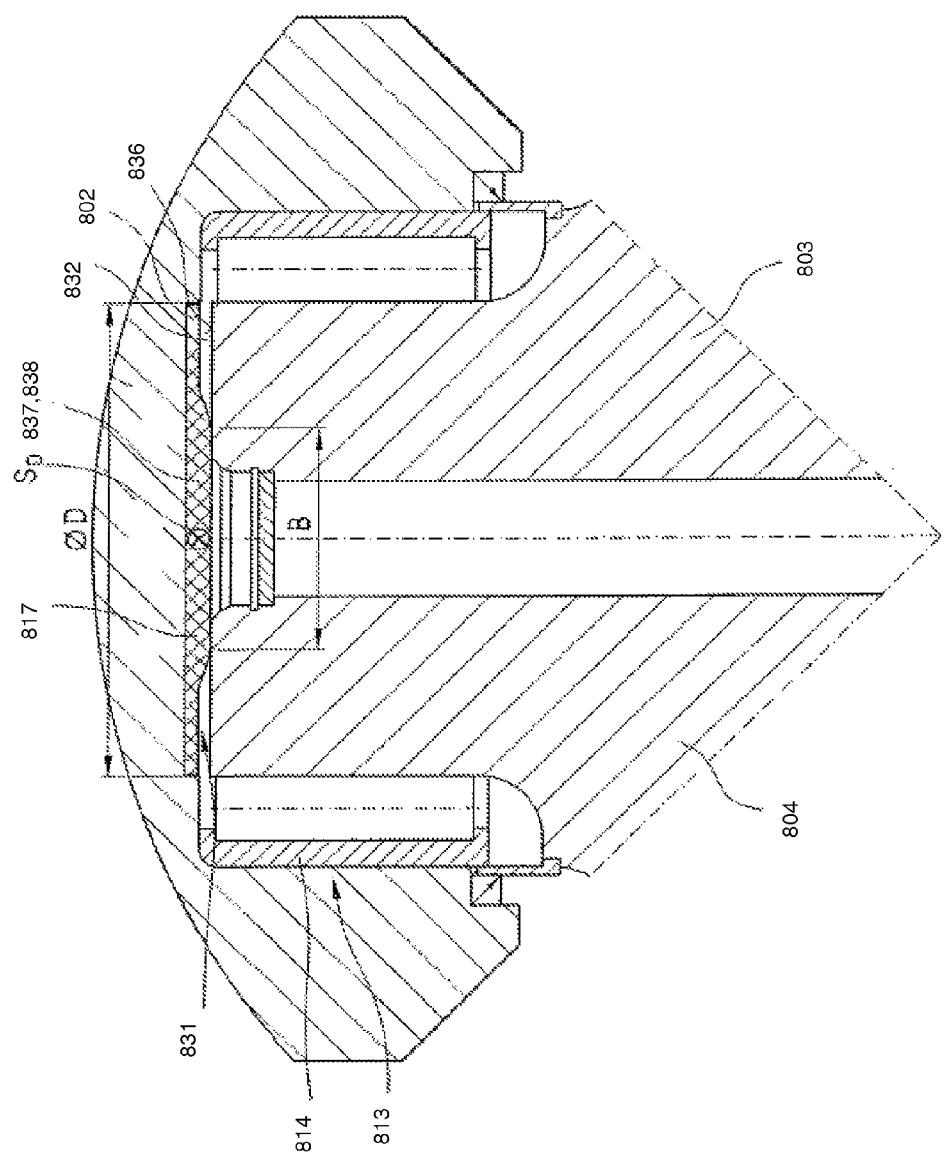

UNIVERSAL JOINT ARRANGEMENT

This application is a divisional application of U.S. patent application Ser. No. 11/635,198, filed Dec. 7, 2006, now issued as U.S. Pat. No. 7,892,099, which claims priority under 35 USC §119 to German application number DE 10 2005 058 743.7, filed Dec. 8, 2005 by Voith Turbo GmbH & Co. KG.

FIELD OF THE INVENTION

The invention relates to a universal joint arrangement.

BACKGROUND OF THE INVENTION

Universal joint arrangements, in particular the bearing systems for suspension of the journal of a journal cross in joint yokes, for installation in propeller shafts are well-known in a number of designs for a multitude of application examples. Reference is made to the publication G 1757 d 08/02 1.000, "FEM-Simulation von Gelenkwellen mit inkompatiblen Netzen", in which the problem of the deformations on the bearing and connection elements under load is disclosed.

Embodiments of universal joint arrangements are known for joint shafts, which comprise a journal cross which is supported by bearings in two joint yokes offset to one another by 90 degrees. The joint yokes themselves can be designed in one piece or in two pieces. For connection of the journal cross in the joint yoke a corresponding bearing arrangement is provided for the individual journals, which comprises a radial bearing and an axial bearing. In the process the radial bearings are always designed as anti-friction bearings (roller bearings), the axial bearings can be designed either as anti-friction bearings (roller bearing) or as friction bearings. For the arrangement of the axial bearing there are a number of possibilities, wherein however under consideration of the occurring deformations during the operation of the joint shaft a corresponding constructive layout of the individual elements of the suspension takes place. The problem of such a bearing arrangement lies in the fact that in the case of anti-friction suspension the individual anti-friction bearings, along with a high base torque, are additionally loaded by high torque impacts and simultaneous transversal accelerations, in particular in the case of use in rolling mill drives. These loads lead to elastic deformations of the joint yoke both in the region of the flange as well as also within the eye of the yoke. In reversing operation the deformations occur additionally with positive or negative value. These influences due to operation as well as design result in misalignments with an unfavorable load application in the bearing, namely a mismatch of the bore of the yoke, inclined position of the bore, spring deflection of the journal as well as a radial clearance in the radial bearing and the spring deflection of the anti-friction bearing, as is disclosed in the publication G 17 57 FIG. 12. The result is an uneven radial pressure distribution in the bearing bore, as a result of which locally high loads on the contact points of the anti-friction body of the radial bearing and excessive edge stresses arise. From the elastic deformations moreover relative movements between journal and bore of the yoke result in axial direction. If these relative movements are hindered by a too stiff bearing embedding, high constraining forces arise and with it high loads of the axial bearings, but only when the axial bearing is designed as an anti-friction bearing. In the case of anti-friction suspension this results in too high edge stresses in one segment of the axial bearing and in lifting of the rollers in the opposing segment. The unequal load results in a lessening of load bearing capacity. The constructive design, in particular the layout of the individual components, is in the process always to be adapted to the possible occurring deformation travels, so that it is not possible to provide a satisfying design independently of the knowledge of these influences.

One solution of this problem is known from the publication EP 1 167 796 B1 with an axial bearing in anti-friction bearing design. This is characterized by the special development of an axial bearing surface on a thrust ring. Here a free travel for the anti-friction elements is created solely through the development of the thrust ring on the basis of the worn material. The disadvantage of this design lies in the fact that the travel is consequently not to be predefined freely, but rather must be specified via the deformation travels determined in the case of specified operational load, as a result of which a complete rubbing contact of all anti-friction elements is not given for different loads, in particular in the partial load range and the negative consequences of the design according to the state of the art cannot be completely eliminated.

From DE 195 10 761 B1 a design of a journal bearing in bushing design anticipated as an axial bearing serves there as a thrust ring constructed as a plastic disk with elastic properties, which in the center exhibits a circular or circular-shaped limited contact surface protruding to the frontal area and near the edge an annular supporting surface, wherein the hollow spaces however only serve to absorb lubricants.

SUMMARY OF THE INVENTION

The invention is therefore based on the object of further developing a bearing system for universal joint arrangements of the initially named type, in particular for use in heavy propeller shafts in such a way that the named disadvantages can be prevented, i.e. said system exhibits a simple structure as well as a low number of components. The elimination of the negative influences in deformation of the torque transferring components to the bearing arrangement, in particular the axial bearing is to be achieved in the process independently from concrete types of load with the most standardized possible solution. The universal joint arrangement, in particular the bearing system and its individual elements should stand out in the process due to a low design and manufacturing expenditure as well as low costs.

A universal joint arrangement comprises a journal cross with two joint yokes offset to one another by 90 degrees and in reflected arrangement to the plane of symmetry of the journal cross located perpendicular to the joint axis. Each joint yoke comprises a flange part and two bearing parts, wherein each bearing part exhibits a bearing bore, in which the journals of the journal cross are supported. Each journal is in the process supported by means of a bearing arrangement, which comprises at least one radial bearing and one axial bearing, wherein the axial bearing is designed as a friction bearing. According to the invention the axial friction bearing comprises in accordance with a first solution attempt at least one separate axial friction bearing mold element which under formation of a first friction pairing supports itself at least indirectly on the joint yoke and a second friction pairing supports itself at least indirectly on the journal cross. The axial friction bearing mold element comprises a first plane frontal area and a second one which is characterized by at least one region of an elevation. The region of the elevation forms a support region, which in every function state forms a friction surface either of the first or second friction pairing. The axial friction bearing mold element is arranged in such a way that it rests without active operational load on the universal joint arrangement in the elevation region and elastically deflects under load in said elevation region, wherein the region outside of the elevation region at the first or second frontal area in every load state is free from contact with the connection elements. The elevation range forming a first support region is, referring to conventional solutions, arranged as it were in the region of low relative movements and with it of low elastic deformation, while they lie on the elevation range adjoining this free region in installation position in the region of greatest relative motion. This means that in regions of greatest relative movements even under load a resting of both sides on the axial friction bearing mold element is prevented and with it elastic deformations there can be eliminated.

The region of greatest axial relative movements is located in a cross-sectional plane perpendicular to the joint axis through the respective journal axis. On the side of the relieved radial bearing on this plane the relative movements are enabled by the recesses on the axial friction bearing mold element free from distortion. On the opposing side in the high pressure region of the radial bearing the axial bearing elements stand out from each other.

In accordance with a second solution attempt the axial friction bearing comprises a conventional axial friction bearing pressure disk and supports itself on a correspondingly molded connection element. The shaping corresponds in the process to the shaping described for the axial friction bearing mold element in the first solution attempt. Here too there are partial elevations provided on a frontal area of at least one connection element. This is achieved by means of molding in the case of shaping or production or reworking of the respective connection element or by subsequent connection to correspondingly molded elements, for example by means of material closure. In this case for example corresponding modifications are made to a) the bearing bore, in particular in the case of design as a blind hole on the frontal area facing the journal
b) the journal frontal area
c) the bottom of the bearing bushing for the radial bearing or the bearing lid These are preferably determined by a rotationally symmetrical design, i.e. an elevation, wherein the elevation is characterized viewed in cross-section by constant dimensions in axial direction and viewed perpendicular to it however by changing dimensions. By axial direction in the process the direction of the journal axis is understood.

With the solution according to the invention hence a partial elastic form closure is always realized, which even under the influence of high axial forces does not result in a damage of the bearing or of the connection elements. The known negative effects from the state of the art on the basis of the relative movements are compensated for in this connection by the form of the axial friction bearing mold element or of the connection element. Said connection element is in the process developed in such a way that it exhibits first regions, which are also termed as support regions, which are arranged preferably symmetrically on the element—axial friction bearing mold element or connection element—and in essence lie in the region of the plane, which is characterized by the journal axis and the joint axis or which extend on both sides from this plane in circumferential direction of the journal. These regions are in the process characterized by regions of greater cross-sectional areas, compared to the cross-sectional areas of the adjoining, inactive regions which are formed with the recesses. The enlargement of the cross-sectional area takes place viewed in installation position in the direction of the journal axis. In the regions of greater cross-sectional area a free of play resting against the connection elements always takes place, while in the inactive regions a resting is always prevented with certainty. I.e. in the regions of great relative movement recesses (material removal) prevent a resting of the connection elements under operational load. Through this shaping, which is realized as it were by material reductions in specified regions on the axial friction bearing mold element or the connection element, clearance is thus created for the relative movements of the connection elements occurring due to the deformation. This relates in particular to the connection elements for the radial bearing or the joint yoke. The cross-sectional difference or the material removals are in the process designed in such a way that even in the regions of greater relative movement no contact is given at least on one of the two frontal areas of the axial friction bearing mold element or of the axial pressure disk with the connection elements.

With regard to the installation situation of the axial friction bearing in essence two different relative positions are distinguished. A first position is characterized by the arrangement in the region of the journal root and a second one in the region of the journal frontal area. Depending on these arrangement possibilities differing development possibilities of the solution attempts also result. In the process symmetrical designs, in particular rotationally symmetrical, and non-symmetrical are distinguished. This applies both for the first solution attempt as well as for the second solution attempt.

In the simplest case in accordance with the first solution attempt the axial friction bearing mold element is designed as an annular or disk-shaped element, wherein said element exhibits a first frontal area forming a plane surface and a second frontal area, on which elevations for the formation of the support regions are provided. In the process a design as an annular element is used, in particular in the case of the arrangement of the axial friction bearing in the region of the journal root. Preferably the annular or disk-shaped element is in the process developed in such a way that it is designed rotationally symmetrically with regard to two axes perpendicular to each other. With this two support regions and two inactive regions result on the axial friction bearing mold element, wherein in this case the axial friction bearing mold element can be used regardless of the rotational direction of the universal joint arrangement, i.e. is designed for both rotational directions. The support regions for slight elastic spring deflection in the case of small relative movement are in the process arranged in essence in the region of a plane, which is characterized by the respective journal axis and the joint axis and extend proceeding from this plane on both sides over a sub-region in circumferential direction of the journal. The material recesses, i.e. the regions of lower cross-section are in the process arranged in the areas of the highest or greatest relative movement. High loads of the connection elements are intended to be eliminated through the solution in accordance with the invention. The regions of the greatest relative movement are in the process characterized by an angular range in the journal cross-section, proceeding from a plane that can be described as perpendicular to the joint axis through the journal axis, from said axis in circumferential direction of the journal in both directions in each case in an angular range of $45°<\alpha<60°$, preferably a ~60°. The ranges of greater relative movement of the bearing connection elements hence extend in an angular range on both sides of a plane of symmetry through the journal axis and the joint axis. The regions in the region of the plane, which is clamped by the joint axis and the journal axis or lying on both sides of it, are termed as the regions of lower relative movement. Their location is characterized by the describable plane arranged through the journal axis and the joint axis and extends on both sides proceeding from it in circumferential direction of the journal or the bore of the joint yoke.

Regarding the cross-sectional shaping of the axial friction bearing mold element itself there are no restrictions whatsoever. Decisive is only the fact that a material removal is provided here in the high-load regions in the case of conventional solutions.

For the designs with arrangement of the axial friction bearing mold element in the region of the journal frontal area a number of geometries are also conceivable. The element can be designed symmetrically here also. However, a shape deviating from the symmetrical design is also conceivable. However, in any event it is to be ensured that a fixing of location takes place in circumferential direction. This can be realized by form closure or adhesion force. In the case of a form fit design the axial friction bearing mold element is centered in a recess on the journal frontal area, the joint yoke, a cover element or the floor of a radial bearing bushing. Here too preferably one frontal area is always plane and the other second frontal area is characterized by an elevation. The one frontal area in the process rests plane against one of the connection elements, while the other one rests only in the support region on the connection element. The elevation region extends in the process preferably over the entire element in the direction of depth, i.e. as it were on a plane which is characterized by the journal axis and the joint axis over the entire journal frontal area. The elevation itself can be designed in this direction as a constant cross-section or with cross-sectional changes. In the process emphasis is placed here also on a symmetrical design in installation position parallel to the joint axis in order to guarantee the free exchangeability and the independence with regard to the rotational direction in the case of installation. In the view in the direction of the journal axis concave or convex or other type cross-sectional contours result over the direction of extension viewed on the plane which can be described by the journal and joint axis in installation position.

The axial bearing mold element exhibits for an arrangement in the region of the journal frontal area a plane frontal area and a second frontal area at which the support region is arranged. The base geometry, i.e. the geometry of the plane frontal area is preferably determined by a circular contour, however any other geometry is also conceivable. In the case of deviation from the circular contour the lateral surfaces could be used as centering surfaces, if corresponding complementary recesses or contact surfaces for the centering surfaces are provided on the connection elements, in particular of the journal frontal area. The elevation itself is preferably designed symmetrically in relation to the plane through the joint and respective journal axis and extends along said axis over the entire dimension of the axial friction bearing mold element in this direction.

Preferably the height of the elevation along the plane of journal axis and joint axis and perpendicular thereto is constant. However soft or rounded (or inclined designed) transitions to the regions free from the elevation are also conceivable.

Preferably the external geometry of the individual axial friction bearing mold elements is selected in such a way that said geometry corresponds to the connection elements with regard to contour and dimensioning at least at the flat circular frontal area. In particular this means that preferably the axial friction bearing mold element is designed with the diameter which corresponds either in the case of arrangement on the journal root to the external diameter of the external ring of the radial bearing or in the case of arrangement on the journal frontal area with the diameter which corresponds to the journal diameter. Other designs are conceivable. However, preferably the greatest possible dimension regions are always selected for areal resting of the plane frontal area, in order to guarantee an optimum load bearing performance.

BRIEF DESCRIPTION OF THE DRAWINGS

The solution according to the invention will be explained in the following with the help of figures. The figures show the following:

FIG. 1 illustrates the effects of deformation and axial distortion of journal cross and joint yoke under load in the design of bearing bushing with convention (plane) axial pressure disk (thrust washer);

FIGS. 2 and 2a illustrate with the help of an axial section through a universal joint arrangement an arrangement of an axial friction bearing mold element according to the invention in accordance with the first solution attempt in the region of the journal root;

FIGS. 5a, 5a1, 5b, 5b1, 5c and 5illustrate possible geometry developments of the axial friction bearing mold element in the region of the elevation;

FIGS. 6a, 6b1, 6b2, and 6b3 illustrate alternative designs to FIG. 4;

FIGS. 7 and 8 illustrate a possible development of an axial friction bearing mold element for direct support on the joint yoke or a bearing cover;

FIGS. 9 9A, and 9B illustrate a first design in accordance with the second solution attempt;

DETAILED DESCRIPTION

FIG. 1 illustrates in greatly exaggerated representation of the deformations of the components in a prior art universal joint system 1', the problem underlying the solution according to the invention of the effect of relative movements in axial direction of the journal on the bearing system of a journal cross 3' of a joint yoke 6' with the help of a section from an axial section through the journal cross 3'. Represented in exemplary fashion is a journal 4' having an axis $Z_4$ which is supported by bearings via a bearing system 10' in a joint yoke half 6.1'. Further recognizable is a bearing part 8' of the joint yoke half 6.1'. The bearing system 10' comprises a radial bearing 13'. In the represented case the inner bearing track of the anti-friction elements 15' of the radial bearing 13' is formed by the generated surface 16' of the journal 4'. The exterior bearing surface is formed by a bearing bushing 45'. In the case of torque transfer the circumferential force causes an uneven load of the radial bearing 13', i.e. in the direction of the circumferential force very high edge stresses and on the opposing side a play between the anti-friction elements 15' and the connection elements bearing bushing 45' or journal 4'. This applies in analogy also for the represented axial friction bearing 46' designed as two-sided plane thrust washer, which in accordance with the design of FIG. 1 is arranged for example between journal front side 36' and the inner circumference of the bearing bushing 45'.

Through the spring deflection of the journal cross in the radial bearing great relative movements arise in axial direction of the journal, which in the case of form fit installation position generate high compressive forces on the axial friction bearing mold element 46' plane on both sides and the bushing floor. High loads result from this, in particular in the notch regions of the bearing bushing.

It can be recognized that the axial friction bearing 46' in the case of arrangement on the journal front side 36' viewed in the direction of the circumferential force in the region of a plane of the axial section through the universal joint arrangement does not support, while the opposing region is subject to very high compressive forces.

Figure 2A:
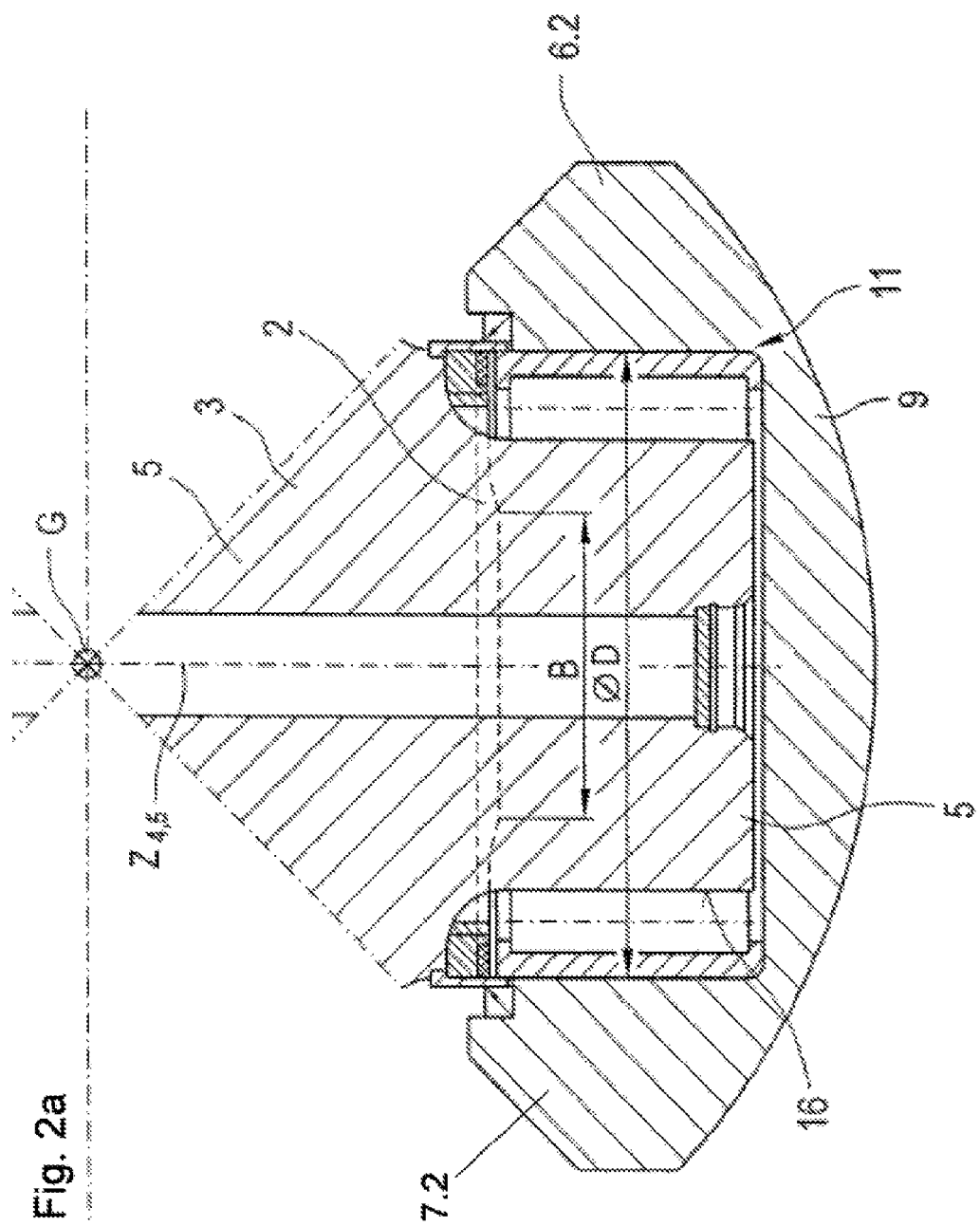

FIGS. 2 and 2a illustrate in schematically simplified representation with the help of a segment from an axial section (this segment divided at the midpoint of axis $Z_{4,5}$ into FIGS. 2 and 2a) through a universal joint arrangement 1 the integration of an axial bearing 17 shaped in accordance with the invention. The universal joint arrangement 1 comprises for this purpose a journal cross 3, which is supported by bearings with its four journals offset from each other by 90°, here by way of example only 4 and 5 (shown in FIG. 2a) in one joint yoke 6. The joint yoke 6 is for this purpose designed in one piece or two pieces depending on the design of the bearing support structures. The separation takes place in the process preferably centrally in a plane of symmetry perpendicular to the axis of the bearing bores in the flange part 7, wherein the individual joint yoke halves 6.1 and lying opposite here 6.2 (shown in FIG. 2a) are then characterized by a flange part 7.1 and 7.2 and each joint yoke half 6.1 and 6.2 comprises a bearing support structure. The bearing support structures 8 and 9 (shown in FIG. 2a) may have bearing bores, represented here by way of example in the form of a blind hole or pocket hole bore 12 for the joint yoke half 6.1, in particular for the bearing support structure 8. The joint yoke arranged offset by 90° and the journals supported by bearings within are not shown. The only bearing system 10 comprises in the process a radial bearing 13. This is preferably designed as an anti-friction bearing, wherein the outer bearing surface is formed by way of example for the anti-friction elements 15 by a retaining ring 14. The inner bearing surface for the anti-friction elements 15 is formed for example by the generated surface 16 of the journal 4 supported by bearings in the bearing support construction 8. In addition the bearing system comprises an axial bearing 17 which comprises in accordance with the invention an axial mold friction bearing element 2. This is arranged in accordance with FIG. 2 in the region of the journal root 18 of the journal 4. In the process the axial mold friction bearing element 2 forms with the connection elements 21, 22 friction pairings 20.1 and 20.2. In the process the individual friction surfaces on the connection elements 21, 22 are formed by the retaining ring 14 of the radial bearing 13 and a bearing flange 23. The axial mold friction bearing 2 supports itself in the process on the bearing flange 23, which in turn supports itself on the journal cross 3, in particular the journal root 18. In the process in the represented case the frontal area facing in the direction to the joint axis G of the retaining ring 14 of the radial bearing 13 forms a friction surface and the axial friction bearing form element 2 forms the additional friction surface of the friction pairing 20.1. Further a second friction pairing 20.2 is provided here, which is formed out of the axial mold friction bearing element 2 and the bearing flange 23.

Figure 3A:
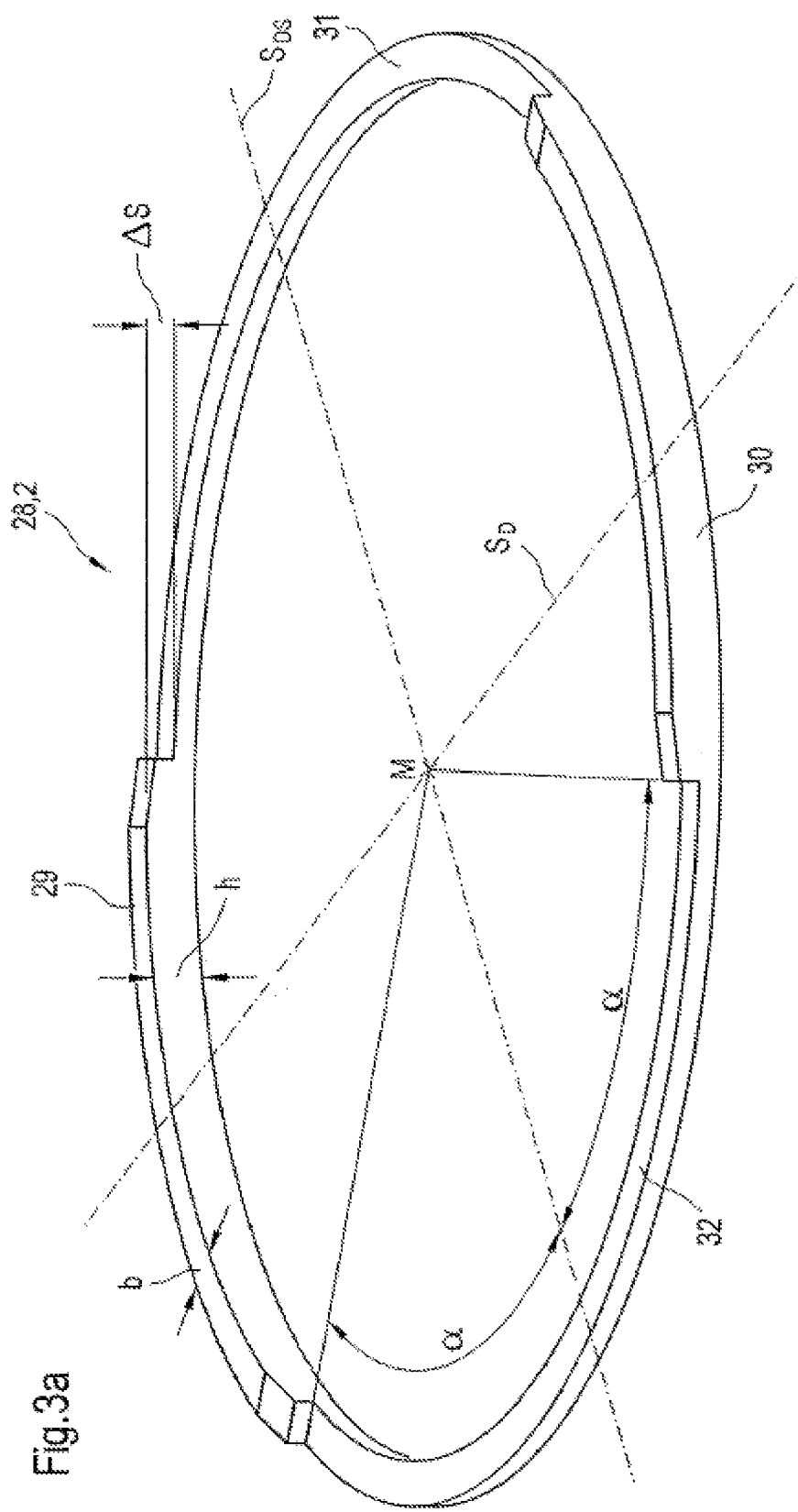
FIGS. 3a through 3c illustrate a possible design of an axial friction bearing mold element according to FIG. 2.
Figure 3B:
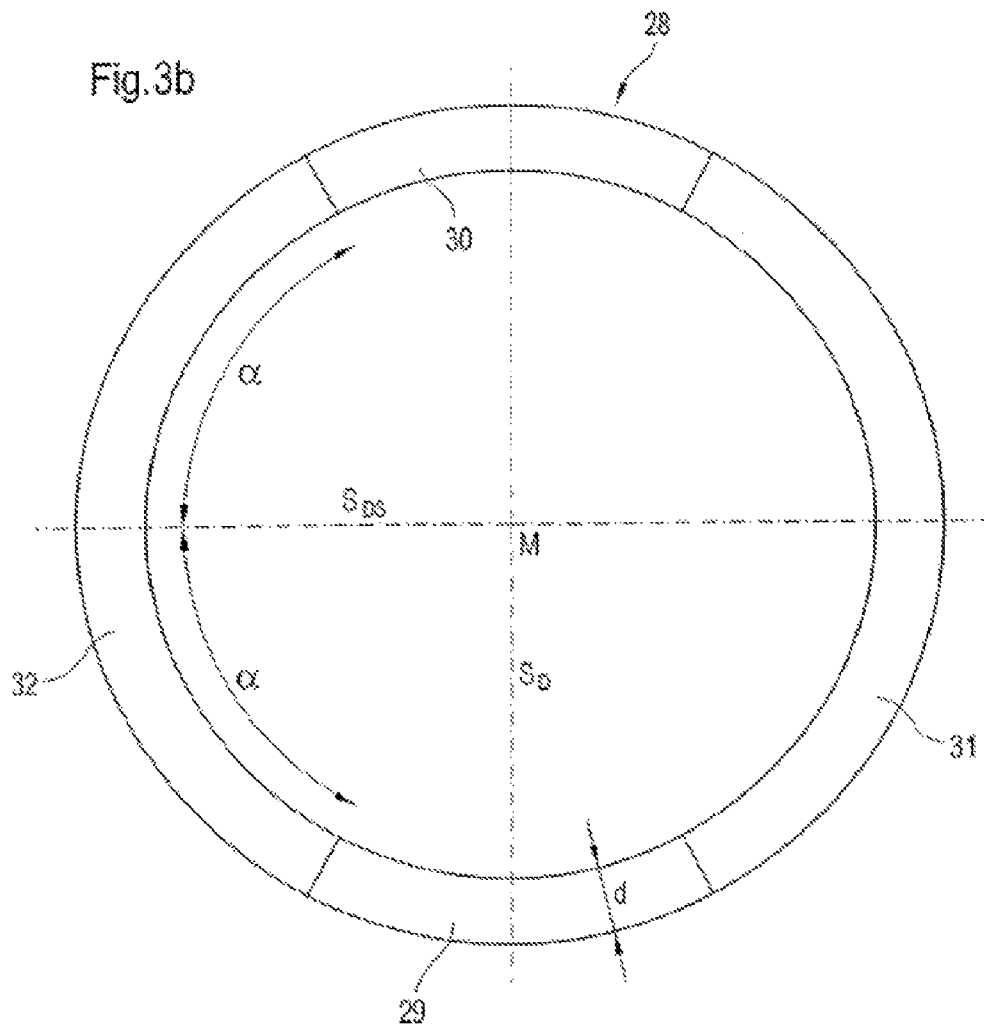
Figure 3C:
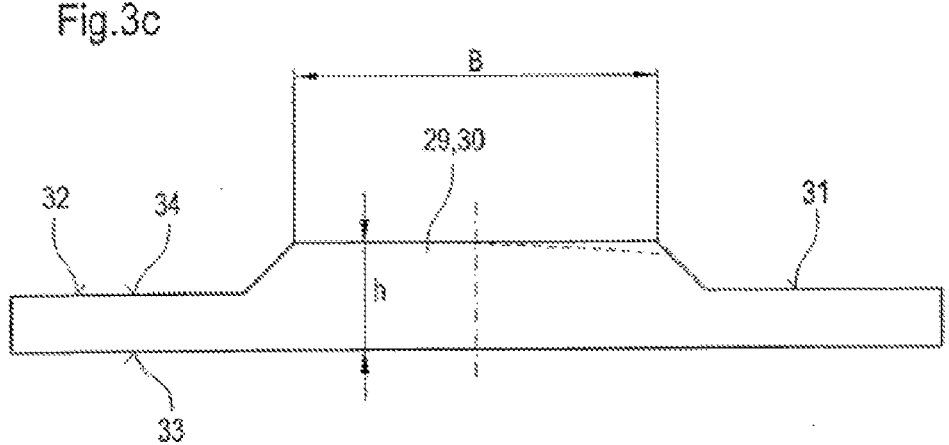

The concrete design of the axial mold friction bearing element 2 is reproduced in FIG. 3. FIG. 3a illustrates in the process a perspective view, while FIG. 3b reproduces in schematically simplified representation a view from above and FIG. 3c reproduces a view from the front. The design of the axial mold friction bearing element 2 shown in FIGS. 3a through 3c is exemplary. Said element is designed as annular element 28, which is characterized by a special shaping, in which case the elastic deformations only occur in the region of small relative movements. As a result of the significantly higher flexibility no high distortions arise. In the regions with great relative movements distortions are prevented by material recesses. Plastics are used as material, in particular elastomers which are characterized by a modulus of elasticity in the range of 5000 to 20000 N/mm², preferably 5000 to 10000 N/mm². The axial mold friction bearing 2 is characterized by at least two regions of differently designed out cross-sections. Preferably the arrangement takes place in such a way that the regions of different cross-sections viewed in installation position symmetrically related to the journal axis, which coincides with the center axis M of the annular element 28, are arranged so that in installation position in a universal joint arrangement the function is guaranteed regardless of the rotational direction of the universal joint arrangement. FIGS. 3a through 3c illustrate in the process an axial mold friction bearing element 2 that can be used in such a way for normal operation and reversing operation. For this purpose said element exhibits related to a first line of symmetry $S_D$ extending through the theoretical center point M on a plane through the joint and respective journal axis. For this purpose two symmetrical regions 29 and 30 are arranged, which form in the case of low relative movement of the connection elements form adapting load bearing regions or support regions of the axial bearing in loaded state under the effect of circumferential force. These support regions 29 and 30 are designed identically with regard to the choice of their cross-section and form on the basis of their geometry regions with elevation compared to the remaining cross-sectional regions. The development of the support regions 29, 30 exhibits a symmetrical structure in addition to a line of symmetry $S_{DS}$ aligned perpendicular to the line of symmetry $S_D$ and running through the center point M.

The regions 31 and 32 form recesses and are characterized by smaller cross-sectional dimensions than the support regions. The recesses extend uniformly in circumferential direction of the annular element 28 proceeding from the line of symmetry $S_{DS}$ over a region α. Outside of the angle α in circumferential direction the transition to the regions 29 and 30 occurs proceeding from the line of symmetry $S_{DS}$, said regions only experiencing a slight compressive stress in the case of spring deflection. The support regions 29 and 30 are in the process always active and characterized by a cross-sectional reinforcement in elevation direction. The inactive regions 31, 32 are allocated in installation position to the regions with great relative movements and still exhibit a play even under high operational load. The installation in the universal joint arrangement in accordance with FIG. 2 takes place now in such a way that the support regions 29 and 30 are arranged on a plane through $S_D$, the regions 32 and 31 on the plane through $S_{DS}$.

The spring deflection of the journal cross 3 in the radial bearing 13 causes an uneven distribution of force in the axial bearing 17, wherein in the design as an anti-friction bearing only a fraction of the theoretical load bearing capacity can be used. The lacking plane parallelism of the axial bearing surfaces results in a premature fatigue or wear and tear. On the other hand however the assured dynamic and static load capacities are only guaranteed in a rigid bearing connection design. In order in spite of this to compensate the occurring relative movements between axial bearing 17 and bearing connection elements, the axial mold friction bearing 17 is integrated into the universal joint arrangement in such a way that on the basis of the existing differing cross-sections in circumferential direction an areal resting against the frontal area of the radial bearing shell is only given in the regions of low relative movement. The solution according to the invention is in the process characterized by the fact that the axial mold friction bearing 2 under load enables a partial elastic form closure with the elevation regions. In the regions in which the relative movements are small, a soft spring deflection is enabled, while in the regions with great relative movement free travels are provided which even under load are not completely exhausted, i.e., the recesses guarantee axial relative movements between joint yoke G and journal cross without buildup of elastic deformations in the bearing components. The transition between the regions of differing cross-sectional geometry and/or dimensions takes place in the process either continuously or in stages.

In the region of the elevations the only slight relative movements cause elastic deformations of the axial friction bearing mold elements, the material recesses on the axial friction bearing mold element enable great, contact-free relative movements. Through the choice of a plastic, in particular elastomers, with a modulus of elasticity of 5,000-10,000 N/mm² only slight distortion forces or compressive stresses arise in the axial bearing.

The axial bearing 17 in accordance with FIG. 3a, b, in particular the axial friction bearing mold element 2, is installed in the universal joint arrangement according to FIG. 2 in the manner that the support regions 29 and 30 extend in an angular range between 30° and 45°, preferably ca. 30°, from a plane determined by the joint axis G and the respective journal axis through the axis of symmetry $S_D$. The elevation region is preferably given only in one direction, i.e. on one plane frontal area 20, so that on the opposing plane frontal area 24 an areal resting over the entire circumference against the connection element 22, here the bearing flange 23, is given.

Figure 4:
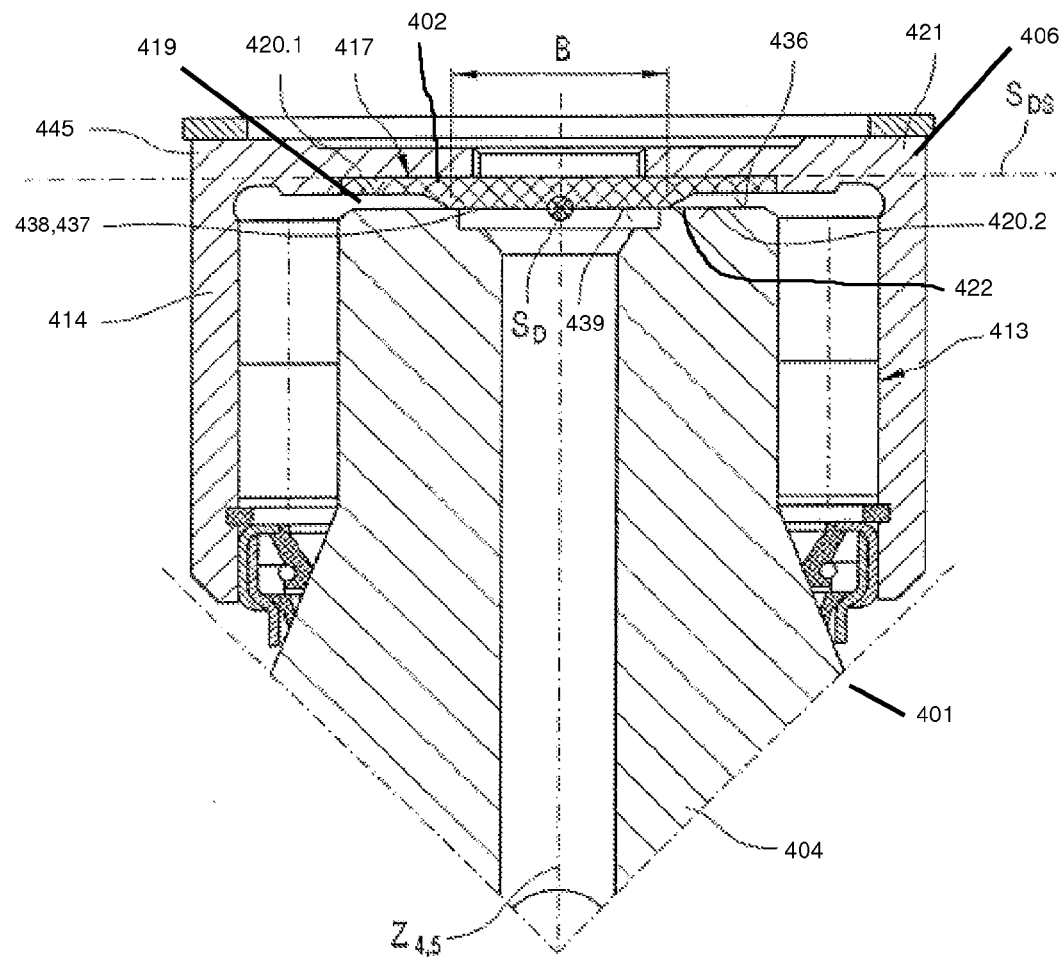
FIG. 4 illustrates an arrangement of an axial friction bearing mold element in the region of the journal frontal area for support on this and on a bearing bushing.

FIG. 4 illustrates an additional possible arrangement of an axial bearing 417 and a universal joint arrangement 401. In the case of this design the arrangement takes place on the front side 436 of the journal 404 supported by bearings in the corresponding joint yoke 406. FIG. 4 represents in the process a first possible embodiment in which the connection element 421 is formed by a bearing bushing 445, while the other bearing connection element 422 is formed by the journal 404. The axial friction bearing 419 is arranged here between the retaining ring 414 of the radial bearing 413 and the frontal area 436 of the journal 404. The friction pairings 420.1, 420.2 are also formed between these elements. For this purpose the axial mold friction bearing element 402 is designed as an annular or disk-shaped element, wherein the shape of a disk is preferred. The disk is designed circular with regard to the geometry on the outer circumference and comprises a non-rotationally symmetrical support region. Viewed in axial section this region extends over a width B in the form of a projection 438, which rests free of play. The alignment of the support region 437 formed by the projection 438 occurs in the process also here preferably again on both sides to the line of symmetry $S_D$ on the plane through the journal axis $Z_{4,5}$ and the joint axis G. The corresponding material recess is located in the process on the frontal area 439 of the axial friction bearing mold element 417 facing the journal cross. The support region 437 in the form of the projection 438 is not designed rotationally symmetrically, but rather extends with a width B over a predefined length I, preferably the entire extent of the axial friction bearing mold element 402 along the line of symmetry $S_D$. The represented elevation in the support region 437 can be limited by plane or curved areas of contact perpendicular to the axial direction. Possible designs are reproduced in greatly simplified representation for a view of the bottom on the axial friction bearing mold element 402 in the direction of the journal axis in accordance with FIG. 4 in FIGS. 5a, 5a1, 5b, 5b1, 5c, and 5c1 These show views of the bearing frontal area with the support region 537a, 537b, and 537c of the axial friction bearing mold element 502a, 502b, 502c. From this it can be seen that the support region 537a, 537b and 537c extends over the entire dimension parallel to the line of symmetry $S_D$. In the process FIGS. 5a and 5a1 illustrate a design with constant width B of the projection 538a along or on both sides of the axis of symmetry $S_D$, i.e. parallel frontal areas of the projection, while FIGS. 5b and 5b1 reproduce a development with concave and FIGS. 5c and 5c1 show a development with convex geometry related to the expansion along the line of symmetry $S_D$.

FIG. 6a illustrates a design of the axial friction bearing mold element 602 in which the material recess is located on the frontal area of the journal 604 in installation position facing the bushing bottom. The bushing bottom u640 forms in the process a first friction surface for the axial mold friction bearing element 602, while the second friction surface of the friction pairing 620.1 is formed here by the frontal area 641 of the axial friction bearing mold element 602. This applies in analogy for the friction pairing 620.2, which is provided between the axial friction bearing mold element 602 and the front side 636 of the journal 604. In the process preferably the axial friction bearing mold element u602 is also arranged for the purpose of its centering in a corresponding recess on the front side 636 of the journal 604. Preferably however it is not a matter of a cylindrical bore here, but rather a groove 644, which simultaneously assumes the centering function for the axial friction bearing mold element 602, i.e. locally fixes the location of the axial friction bearing mold element 602 in the direction of the circumferential force. The width of the groove and with it the extent of the axial friction bearing mold element 602 on the plane perpendicular to the rotational axis of the joint through the journal axis amounts to about the half of the journal diameter. With it in the region of the great axial relative movements corresponding free spaces result between journal frontal area 636 and bushing bottom 640. The axial friction bearing mold element 602, 602b, or 602c is for this purpose by way of example as in FIGS. 6b1, 6b2 represented as a plate-shaped element which by way of example possesses a rectangular base geometry and which exhibits an elevation region 637a 637b, or 637c on its front sides which in installation position forms a first support region. According to FIG. 6b3 the groove for centering of the location of the axial friction bearing mold element 60c2 runs parallel to the line of symmetry $S_D$. As already stated, a circular or cylindrical development of the axial friction bearing mold element 602 is also conceivable, wherein in this case other means for location fixing would be provided. The arrangement occurs in the process free of play between the journal u604 and the bushing bottom 640, wherein corresponding to the relative movements only a slight spring deflection takes place on the basis of the geometric development in the region of the frontal area 641 of the axial friction bearing mold element 602. The designs shown in FIGS. 6b1 through 6b3 are exemplary. A development of the elevation region as shown in FIGS. 5a through 5c is also conceivable.

Figure 7:
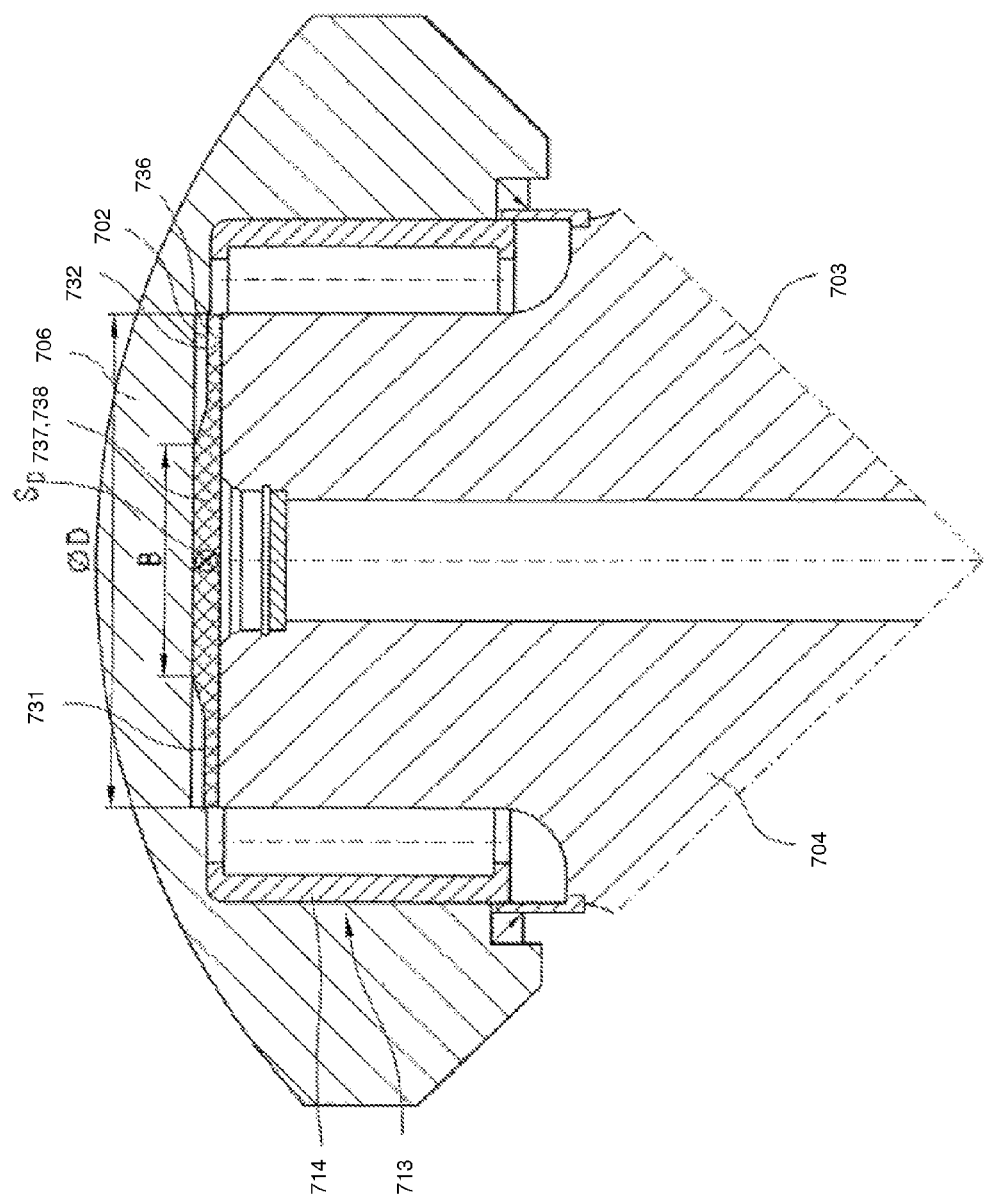

FIG. 7 illustrates on the other hand an alternative design according to FIG. 6 with the design of the axial bearing in a blind hole in the case of direct support on the journal yoke half 706. The axial bearing 717 is hence arranged here directly between the joint yoke 706 and journal 704. Regarding the design there are again also several possibilities. Preferably the axial friction bearing mold element 702 is designed as a cylindrical disk, wherein said disk is designed in the center region, i.e. on both sides of the line of symmetry $S_D$, with a corresponding elevation. This can extend over a sub-region of the radial extent of the disk element or, as shown here, preferably over the entire dimension parallel or inclined or curved compared to the line of symmetry $S_D$. The support region 737 is in the process directed to the joint yoke 706. The opposing plane front side rests areal against the frontal area 736 of the journal 704. The regions 731, 732 free from the elevation are arranged in the regions of greater relative movement. This, in particular the front side of the axial friction bearing mold element 702 bearing the elevation, forms a free space with the joint yoke G in the process in the regions of great relative movement. The elevation or support region 737 can be designed cylindrical or by way of example corresponding to the designs in FIGS. 5a through 5c.

In contrast FIG. 8 illustrates a development of the axial friction bearing mold element 802 with support between journal front side 836 and the bottom of the yoke bore 849 or a differently developed bottom, for example in the form of a bearing cover, wherein here the support region 837 is directed to the front side 836 of the journal 804 and supports itself on it.

In FIGS. 7 and 8 the axial friction bearing mold element 702 or 802 is designed disk-shaped or annular, wherein the disk-shaped or annular element comprises a first front side characterized by a plane surface and the support region 737 or 837 provided for elastic spring deflection is designed on the second opposing frontal area. The support region 737 or 837 resting free of play on the connection element in all function states is in this case not rotationally symmetrical, but rather is designed for example similar to the representations described in FIGS. 5a through 5c. It is also conceivable to design the support regions 737, 738, 837, or 838 not in one piece, but rather segmented.

If FIGS. 1 through 8 illustrate designs with separate axial friction bearing mold element 2, this function can in accordance with FIGS. 9, 9A, 9B, and 10 in accordance with a second solution attempt be assumed by the connection elements joint yoke 906, journal 904, and/or bearing bushing, i.e. the function of the axial friction bearing mold element 2 is then executed directly by these elements. The joint yoke 906 may be formed in two pieces as described with respect to FIGS. 2 and 2a.

Figure 9A:
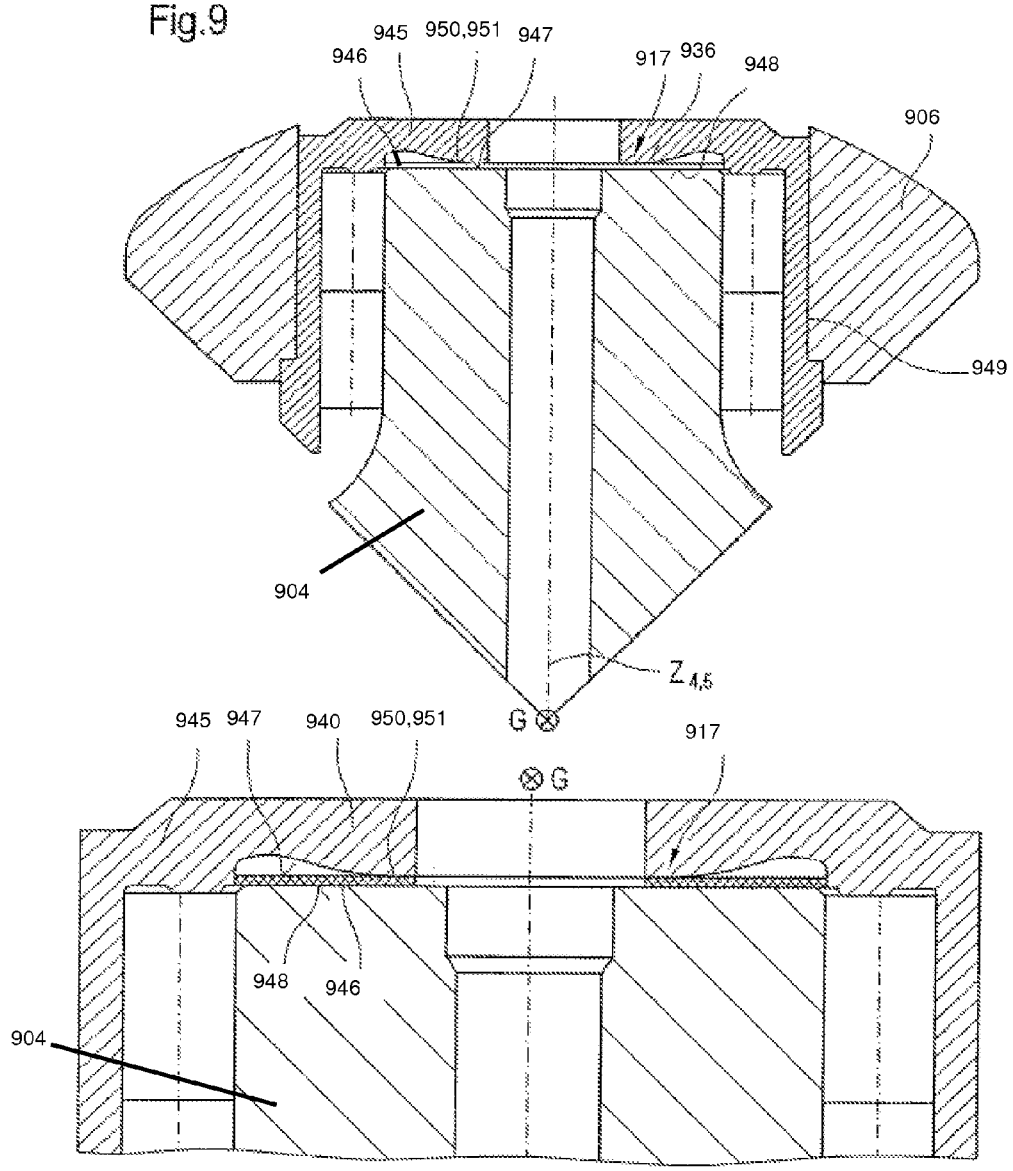
Figure 9B:
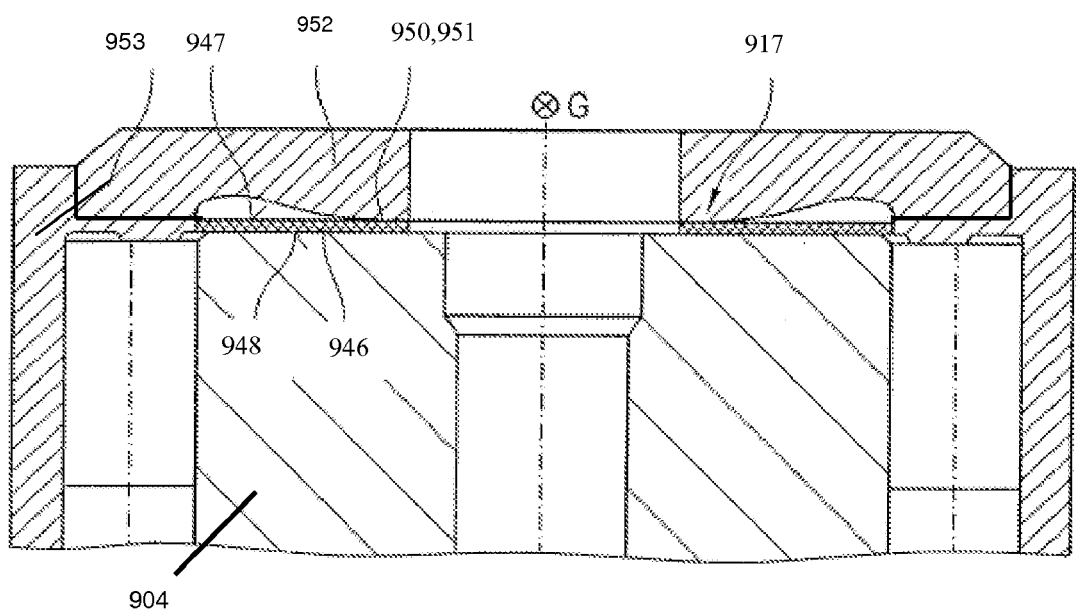

In accordance with FIGS. 9, 9A and 9B the axial bearing 917 comprises an axial bearing pressure disk 946 as in the case of designs according to the state of the art, preferably with plane front side 947, 948 on both sides. The function of the axial friction bearing mold element is assumed in accordance with FIGS. 9, 9A and 9B by way of example by the bearing bushing 945, in particular the bushing bottom 940, or by a through bore bearing 953 in combination with bearing cover 952, as shown in FIG. 9B. An assumption of function by the joint yoke 906 in particular the closed bearing bore 949 is also conceivable.

The support region 950 in the form of the elevation 951 is in the process correspondingly incorporated in the bushing bottom 940 as shown in FIG. 9A or bearing cover 952, as shown in FIG. 9B. The bushing bottom 940 or bearing cover 952 is a connection element that in turn forms a friction pairing with front side 947 of axial bearing pressure disk 946. Preferably this takes place by removal of material for example grinding. Regarding the design of the elevation 951 a multitude of possibilities exists with the restriction that as a result of the rotation of the bearing bushing in operation a rotationally symmetrical shaping is to be selected. Decisive is the fact that only the center region of the bushing bottom 940 is active by elevation as a support region 950 and the outer regions of the bushing bottom 940 form free spaces to the journal front side 936. These free spaces enable relative movements without causing axial distortions on the connection elements.

Figure 10:
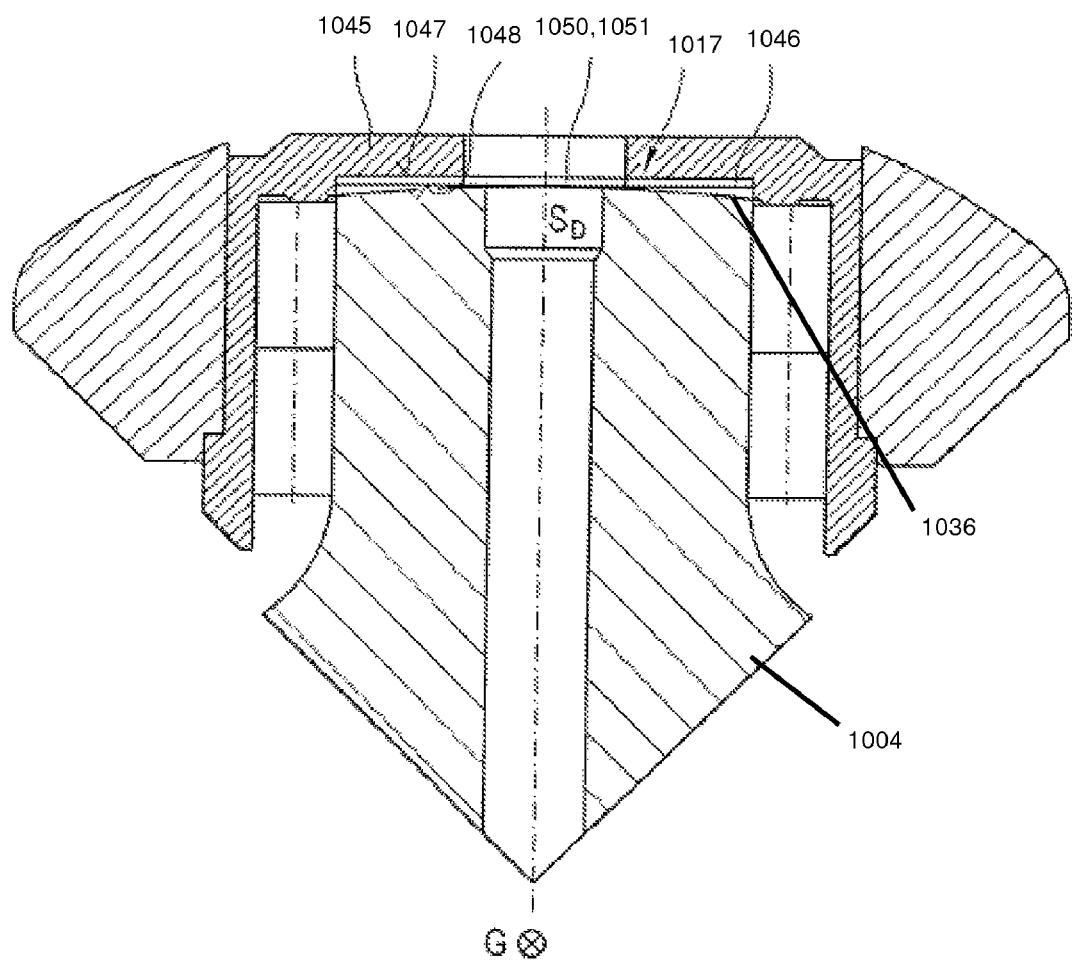
FIG. 10 illustrates a second design in accordance with the second solution attempt.

FIG. 10 illustrates an addition design in integral style on the journal 1004, in particular the frontal area 1036. Here the support region 1050 is formed by an elevation region 1051, which is designed in installation position with its axis of symmetry SD parallel to the joint axis G. These support regions can be formed by one surface or a multitude of individual segment-type surface regions, designed spaced apart from one another.

The support takes place directly or via an axial bearing pressure disk 1046 as in the case of the designs according to the state of the art. The front face 1047 of axial bearing pressure disk 1046 forms a friction pairing with planar surface 1020 of bearing bushing 1045.

The design of the elevation region 1051 on the journal frontal area can also take place variably. In the simplest case in turn by corresponding material removal. The elevation region 1051 may extends on both sides of the line of symmetry $S_D$ over the entire extent of the axial bearing pressure disk 1046. The geometry of the elevation region 1051 in the direction of the line of symmetry may be a constant width, convex and concave, similar to the axial bearing disks shown in FIGS. 5a, 5a1, 5b, 5ba, 5c, and 5c1. Regarding the geometrical development there are also a multitude of possibilities. These can be designed viewed in cross-section rounded or with sharp edges. Further they can be designed rotationally symmetrical in a view from above with regard to the journal axis or with regard to an axis perpendicular to the journal axis running parallel to the joint axis.

REFERENCE LIST

1 Universal joint arrangement
2 Axial friction bearing mold element
3 Journal cross
4,5 Journal
6 Joint yoke
6.1, 6.2 Joint yoke half
7 Flange part
8,9 Bearing part
10,11 Bearing system
12 Bearing bore
13 Radial bearing
14 Retaining ring
15 Anti-friction element
16 Generated surface of the journal
17 Axial bearing
18 Journal root
19 Axial friction bearing
20.1,20.2 Friction pairing
21 Connection element exterior
22 Connection element interior
23 Bearing flange
24 Frontal area
25 Friction pairing
26 Centering device
27 Seal retainer
28 Annular element
29 Support region
30 Support region
31 Region recess
32 Region recess
33 $1^{St}$ frontal area axial bearing mold element
34 $2^{nd}$ frontal area axial bearing mold element
35 Surface
36 Front side 37 Support region
38 Cone, projection
39 Front side
40 Bushing bottom
41 Front side
42 Friction pairing
43 Journal bore
44 Groove
45 Bearing bushing
46 Axial bearing pressure disk as thrust washer
47 Front side
48 Front side
49 Bearing bore
50 Support region
51 Elevation
$S_{DS}$ Line of symmetry
$S_D$ Line of symmetry
a Distance from the axis of symmetry in circumferential direction
$Z_{4,5}$ Journal axis
G Rotational axis of the joint shaft
a Angle of circumference recess
B Width of the support region
b Thickness of the axial friction bearing mold element
h Height of the support region of the axial friction bearing mold element

The invention claimed is:

1. A universal joint arrangement, comprising:
a journal cross, supported in two joint yokes offset to one another by about 90° and in reflected arrangement to the plane of symmetry of the journal cross located perpendicular to the joint axis, each joint yoke comprising a flange part and two bearing parts,
a bearing bore in each bearing part, wherein the journals of the journal cross are supported in the bearing bores;
at least one bearing arrangement for supporting the journals in the bearing bores, the bearing arrangement comprising a radial bearing and an axial bearing, wherein the axial bearing is a friction bearing comprising an axial bearing pressure disk that is at least indirectly supported by a first connection element on the joint yoke to form a first friction pairing and a second connection element on the journal cross to form a second friction pairing; and
a surface on the first or second connection element that faces the axial bearing pressure disk, the surface having a recessed region and an elevation region that forms a support region extending along a line of symmetry aligned perpendicular to and intersecting with the journal axis and parallel to the joint axis, wherein the support region forms a friction surface of the first or second friction pairing.

2. The universal joint arrangement according to claim 1, characterized in that the support region has a width centered on the line of symmetry, the support region extends over the entire diameter of the axial bearing pressure disk along the line of symmetry, and the width is less than the diameter of the axial bearing pressure disk.

3. The universal joint arrangement according to claim 1, characterized in that the elevation has a variable cross-section in the direction of the line of symmetry.

4. The universal joint arrangement according to claim 1, characterized in that the geometry of the elevation region in the direction of the line of symmetry is selected from the group consisting of: a constant width, convex and concave.

5. The universal joint arrangement according to claim 1, characterized in that the elevation region is provided on the first or second connection element by material removal.

6. The universal joint arrangement according to claim 1, wherein the second connection element having an elevation region is formed on a front side of the journal.

7. The universal joint arrangement according to claim 1, wherein the first connection element having an elevation region formed on a surface of the bearing bore oriented to a front side of a journal.

8. The universal joint arrangement according to claim 1, the joint yoke further comprising a radial bearing bushing having a surface facing the journal that forms the first connection element.

9. The universal joint arrangement according to claim 1, the joint yoke further comprising a bearing cover that forms the first connection element.

10. The universal joint arrangement according to claim 1, characterized in that the bearing bore is a through bore or a blind hole.

11. The universal joint arrangement according to claim 1, characterized in that the joint yokes are designed in two pieces.

12. The universal joint arrangement according to claim 1, characterized in that the support region is on the second connection element, the support region has a width centered on the line of symmetry, the support region extends over the entire diameter of the axial bearing pressure disk along the line of symmetry, and the width is less than the diameter of the axial bearing pressure disk.

* * * * *